United States Patent [19]

Yamada

[11] Patent Number: 4,626,902
[45] Date of Patent: Dec. 2, 1986

[54] METHOD AND SYSTEM FOR PROCESSING A BORDER PIXEL

[75] Inventor: Mitsuhiko Yamada, Kyoto, Japan

[73] Assignee: Dainippon Screen Manufacturing Co., Ltd., Japan

[21] Appl. No.: 602,468

[22] Filed: Apr. 20, 1984

[30] Foreign Application Priority Data

Aug. 11, 1983 [JP] Japan .................. 58-147710

[51] Int. Cl.$^4$ .................. H04N 1/46; H04N 1/40
[52] U.S. Cl. .................. 358/75; 358/280; 358/283; 358/284
[58] Field of Search .................. 358/75, 78, 80, 282, 358/283, 280, 298, 296, 284

[56] References Cited

U.S. PATENT DOCUMENTS

| | | | |
|---|---|---|---|
| 4,124,870 | 11/1978 | Schatz et al. | 358/260 |
| 4,150,400 | 4/1979 | Wong | 358/260 |
| 4,496,989 | 1/1985 | Hirosawa | 358/280 |
| 4,553,172 | 11/1985 | Yamada et al. | 358/283 |

FOREIGN PATENT DOCUMENTS

| | | |
|---|---|---|
| 2386213 | 10/1978 | France . |
| 2530050 | 1/1984 | France . |
| 2102240A | 1/1983 | United Kingdom . |

*Primary Examiner*—James J. Groody
*Assistant Examiner*—Randall S. Svihla
*Attorney, Agent, or Firm*—Lowe, Price, Leblanc, Becker & Shur

[57] ABSTRACT

To improve the quality of border pixels located between pictorial components, between a pictorial component and a rule component or between a pictorial component and a screen tint component in an image reproduction system, each border pixel is recorded using image data contained in selected pixels that surround the border pixel being reproduced. Which ones of the surrounding pixels are selected are determined by a digital word associated with the border pixel.

20 Claims, 29 Drawing Figures

FIG. 8(a)
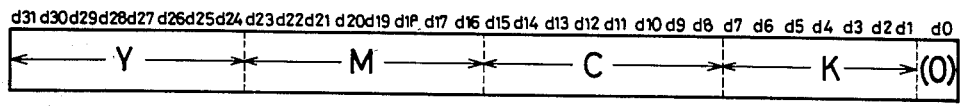
FIG. 8(b)
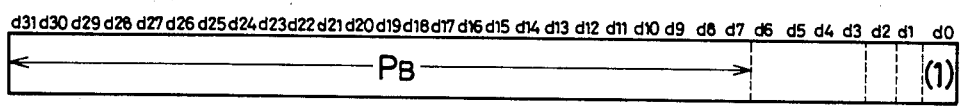
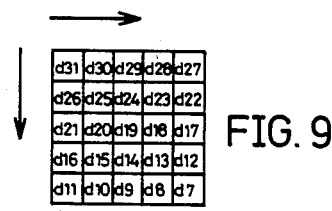
FIG. 9
FIG. 10(a)   FIG. 10(b)   FIG. 10(c)   FIG. 10(d)
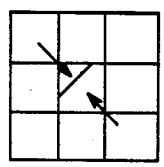 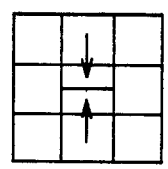 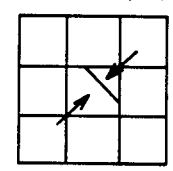 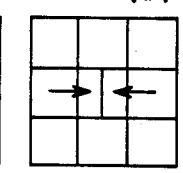
FIG. 10(e)   FIG. 10(f)   FIG. 10(g)   FIG. 10(h)
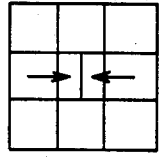 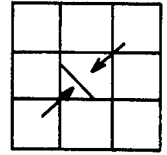 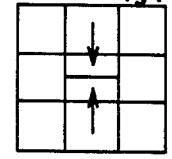 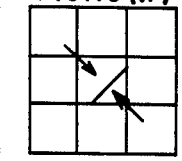

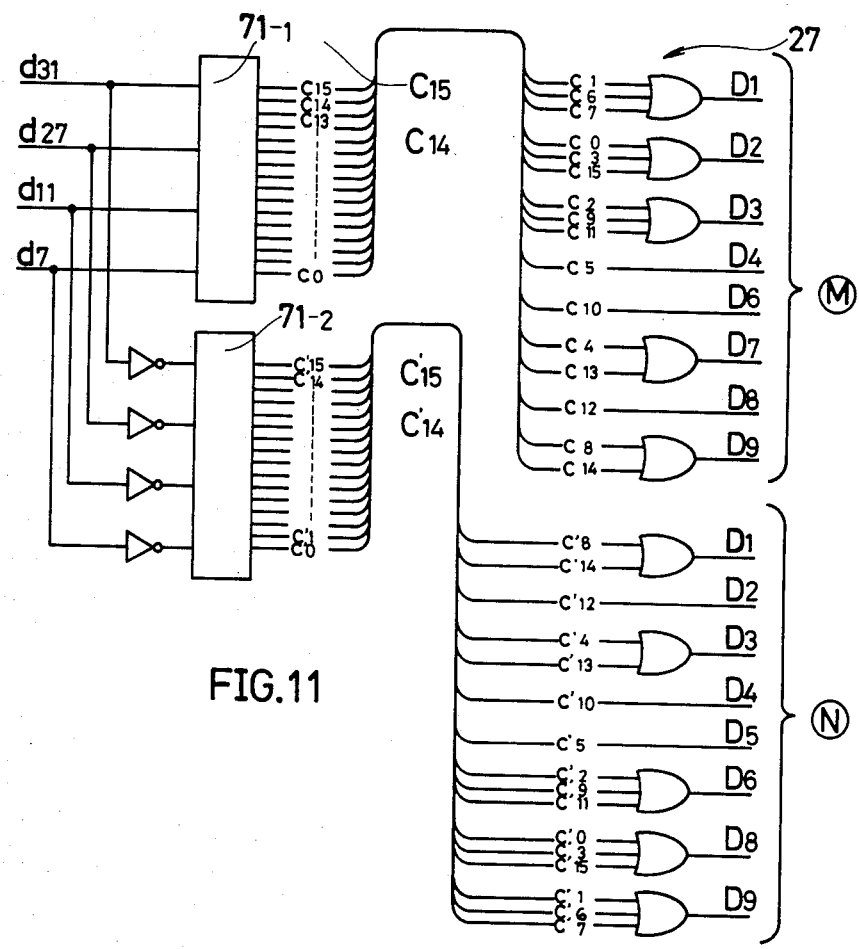
FIG.11
FIG.17
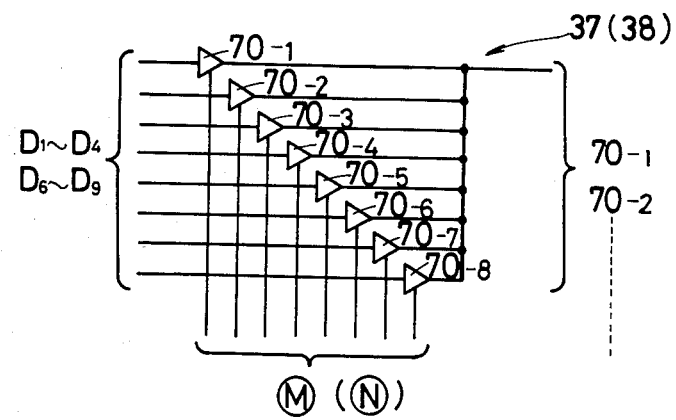

METHOD AND SYSTEM FOR PROCESSING A BORDER PIXEL

FIELD OF THE INVENTION

This invention relates generally to a method and system for processing a border pixel located between a pictorial component and another one (a pictorial component, a ruling line component or a screen tint component) to be recorded on a reproduction image by using an image reproducing system such as a layout scanner, and more particularly to such a method and system in which the border pixel is recorded by using halftone dot image data of at least one of the surrounding pixel(s) thereof.

BACKGROUND OF THE INVENTION

In the field of image reproducing systems such as a color scanner, a layout scanner system exists which has a function of recording the images of plural original pictures on a photosensitive film in a desired layout pattern. However, if a a pictorial component having various halftone dot density gradations and a letter or drawing (called a "literal" hereinafter) component having a binary level (black or white) must be recorded together in a desired layout pattern on a photosensitive film, higher resolving power is required for recording the pixels of the literal component in comparison with that for recording the pixels of the pictorial component, because the literal component consists mainly of fine line segments. Thus, if both components are recorded with an identical resolving power suitable for recording the literal component, excessive processing time is needed.

In addition, when a disc memory is used for performing layout work, the memory is required to have greater amount of capacity, which causes longer processing time. In order to resolve the above problem, U.S. application Ser. No. 471,859, now U.S. Pat. No. 4,553,172, discloses a method wherein first image data of pictorial components and that of literal components scanned more minutely are together input to one memory according to a desired layout pattern, wherein both data are separable. The image data are then output from the memory separately to be used for recording respective reproduction images on a photosensitive film.

However in this method, as the border pixels between both components can only be recorded by the image data of either the pictorial component or the literal component, there exists a drawback that a vacant (white) portion might be produced along the border.

In order to overcome the above drawback, U.S. application Ser. No. 507,719 discloses a method in which the border pixels between a literal component $P_L$ and a pictorial component $P_P$ are recorded using the image data of both components simultaneously as shown in FIG. 1. To prevent any blank areas along contours of the line drawing in the reproduction from occurring, graphic signals originating from pictorial element of a line drawing are added to a line signal originating from the pictorial element. This method is also permissible when the literal pixel is recorded in 100% halftone dot density, but produces an unwelcome solid portion $P_S$ on the border pixels when the literal component is recorded in less than 100% halftone dot density as shown in FIG. 1.

On the other hand, U.S. application Ser. No. 532,737 discloses a method in which the border pixels are recorded by converting picture and line signals into different digital words having the same number of bits and adding bits to distinguish between line and picture signals. A dot is formed in the picture portion according to picture information. In the line drawing, a screen tint is formed according to dot percentage data, and in the boundary portion line drawing data rather than picture data are output. However in this method, because the border pixels are not recorded by using the pictorial component data, a vacant portion $P_{P0}$ is produced on the border pixels as shown in FIG. 2. Even this method, however, cannot resolve the conventional problems.

Furthermore, conventional methods have a common drawback of the appearance of vacant portions owing to incorrect registration, which also affects the quality of reproduced images.

SUMMARY OF THE INVENTION

An object of this invention is to accurately process a border pixel between a pictorial component and another one (a pictorial component, a ruling line component or a screen tint component) in order to produce no "undesirable" solid portion (like portion $P_{L0}$ in FIG. 1) or "vacant portion" (like portion $P_{P0}$ in FIG. 2). Another object is to prevent a "vacant portion" from appearing caused by a "shear" produced by poor registration.

In order to realize the above objects, this invention provides the following method.

A border pixel between a pictorial component and another one (a pictorial component, a ruling line component or a screen tint component) is recorded using image data of one or two out of the surrounding pixels of the border pixel. Which pixel(s) should be selected for recording the border pixel depends upon the content of the bit data unit (called a "word" hereinafter) for expressing the border pixel. This selection process is shown generally in FIG. 10, and more specifically in Table 1. How image data of the selected pixel(s) are used for recording the border pixel is as shown in Table 2.

The above and other objects and features of this invention can be appreciated more fully from the following detailed description when read with reference to the accompanying drawings.

BRIEF DESCRIPTION OF THE DRAWINGS

FIGS. 8(a)-8(b) show two examples of the construction of a "word" (bit unit).

FIG. 9 shows a bit pattern of a pixel in which each bit corresponds to the "word" shown in FIG. 8(b).

FIGS. 10(a)-10(h) show the pixels to be selected, of which data are to be used for recording the border pixel in each case.

FIG. 11 shows a surrounding pixel selector for selecting the image data of appropriate surrounding pixels for recording the pixel to be processed.

FIG. 17 shows a pixel data selector of this invention.

PREFERRED EMBODIMENT OF THE INVENTION

In the following a "border pixel" is defined as a pixel which contains more than one type of image data, of which surface area is equivalent to that of a pictorial pixel. And the "pictorial pixel" is a term general to a literal pixel such as a letter or drawing (expressed by using halftone dots of 100%) and a screen tint pixel (expressed by using halftone dots of a constant density less than 100%; a screen tint is defined herein as a tone without gradation, i.e., having only one tone value) as well as to a picture pixel (expressed by using halftone dots of various densities).

Figure 1:
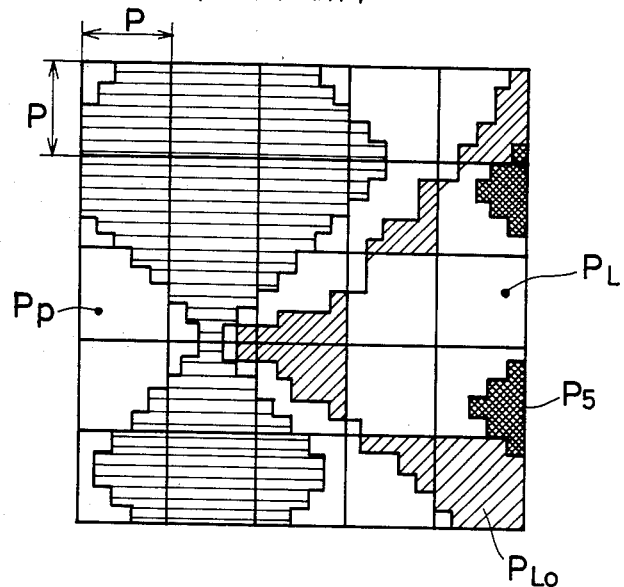
FIG. 1 is a diagram of the region around the border pixels of a reproduction image wherein the border pixels are recorded using a conventional method.
Figure 2:
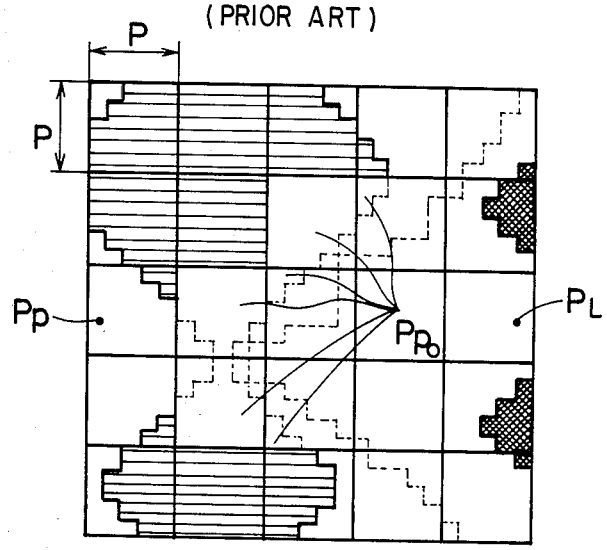
FIG. 2 is a diagram of the region around border pixels of a reproduction image wherein the border pixels are recorded by using another conventional method.
Figure 3:
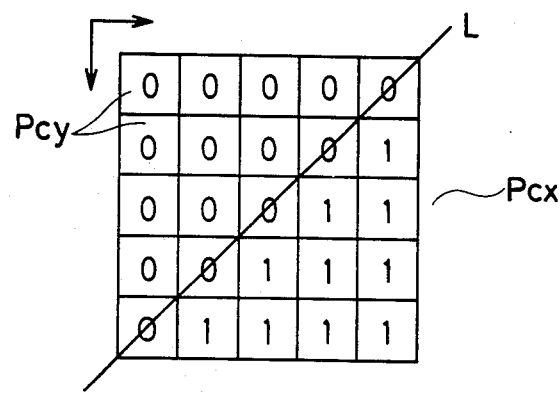
FIG. 3 shows the bit pattern of a border pixel.

FIG. 3 shows an example of the bit pattern of a border pixel, which state is presented by an interface between a pictorial component and a literal component or a screen tint component. In this, 5×5 literal pixels $P_{cy}$ arranged in matrix in the main and subscanning directions correspond to one pictorial pixel $P_{cx}$, and each literal pixel $P_{cy}$ is numbered "0" and "1" to represent the border state (a line L is an approximate border line). On the other hand, when the pictorial pixel is expressed in 32 bit data (one "word"), the 5×5 literal pixels in matrix are expressed in 25 bit data in order to be processed together with the pictorial pixel data.

Figure 4:
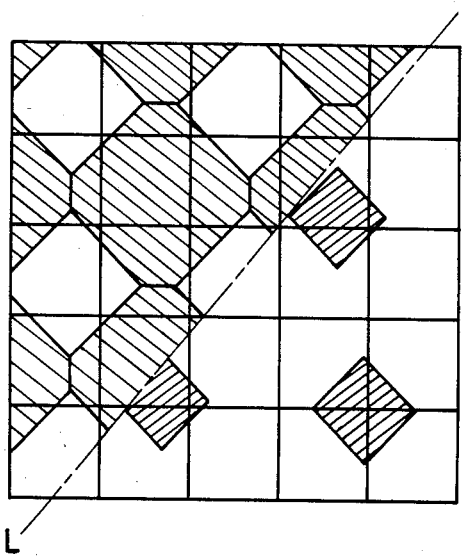
FIG. 4 shows the region around border pixels of a reproduction image wherein the border pixels are recorded by using the method of this invention.

FIG. 4 shows an example of the state of a border pixel produced using the method of this invention wherein two distinct types of halftone dots are recorded together sharing the border line L on the border pixel.

Figure 5:
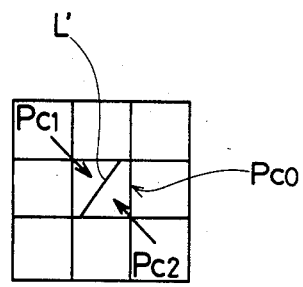
FIG. 5 shows a border pixel and the surrounding pixels thereof for explaining the concept of the method of this invention.
Figure 6:
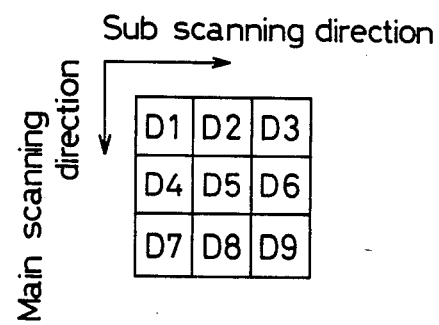
FIG. 6 shows a supplementary chart for explaining the concept of the method of this invention.

FIG. 5 shows a border pixel and the surrounding pixels thereof for explaining the conception of the method of this invention, in which two distinct halftone dots are recorded together sharing a border line on a border pixel of which surface area corresponds to one pictorial pixel as shown in FIG. 4. FIG. 6 shows a supplementary chart for explaining FIG. 5. It is now assumed the border and the surrounding pixels thereof are given signs $D_1$ to $D_9$ as shown in FIG. 6. When a border line L' traverses a pixel $P_{c0}$ as shown in FIG. 5, in other words, the central pixel $D_5$ of FIG. 6 is a border pixel between for example two pictorial components, the border pixel $P_{c0}$ ($D_5$) is recorded as follows. In FIG. 6, the pixels $D_2$, $D_5$ and $D_8$ are situated on one record scanning line. When the record scanning point comes to the pixel $D_5$, at first image data of two out of the pixels $D_1 \ldots D_4$, $D_6 \ldots D_9$ are selected according to a rule (mentioned later), then, the pixel $D_5$ is recorded using the image data of the selected two surrounding pixels sharing the border line L'.

Figure 7A:
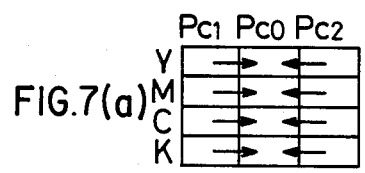
FIGS. 7(a)-7(c) show sections of layers, each of which consists of four color separation inks.
Figure 7C:
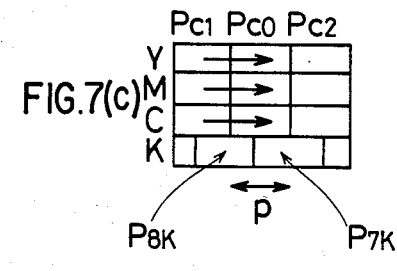
Figure 7B:
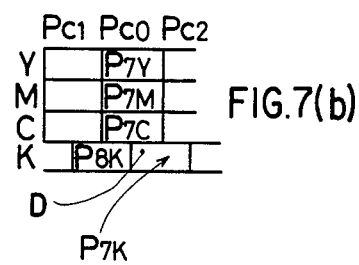

In addition, the method of this invention can prevent the appearance of a vacant portion which takes place on a print made of four color separation images Y (Yellow), M (Magenta), C (Cyan) and K (Black) having a discrepancy caused by poorly performed registration. Thus, with reference to FIGS. 7(a)-7(c), the invention prevents appearance of any vacant or blank portions in a border pixel, otherwise caused by poor coincidence of the four color separation images, by adding data borrowed from surrounding pixels. In FIG. 7(a), there are no blank or vacant regions because all four color separation images coincide with each other. However, when a black color separation image is out of position by a half width of one pixel, as shown in FIG. 7(b), a vacant portion D appears along a printed rule when image data of 0% are applied to applied to elements $P_{7Y}$, $P_{7M}$ and $P_{7C}$ on color separation images Y, M and C, respectively, as well as to an adjoining element $P_{8K}$ while image data of 100% are applied to element $P_{7K}$. This is avoided by adding image data of pictorial element $P_{C1}$ to element $P_{C0}$ on color separation images Y, M and C as shown in FIG. 7(c).

More specifically, FIG. 7(a) shows a state in which the color separation images are printed in a perfect location (perfectly registered). When two surrounding pixels $P_{c1}$ and $P_{c2}$ of the border pixel $P_{c0}$ contain more than 0% halftone dots, the border pixel $P_{c0}$ can be recorded using the image data of the pixels $P_{c1}$ and $P_{c2}$ as shown as solid arrows in FIG. 7(a). Even when the color separation images are not printed in a perfect location (poorly registered), no vacant portion is produced as long as the pixels $P_{c1}$ and $P_{c2}$ contain halftone dots.

FIG. 7(b) shows a section of the ink layers of a ruling line, where the ruling line is recorded having a shear corresponding to one half of the width of a pictorial pixel of a Black (K) layer. When the ruling line is composed of a Yellow (Y) layer $P_{7Y}$, Magenta (M) layer $P_{7M}$, Cyan (C) layer $P_{7C}$ and Black (K) layer, and the halftone dot percentage of the layers $P_{7Y}$, $P_{7M}$, $P_{7C}$ and $P_{7K}$ are $P_{7Y}=P_{7M}=P_{7C}=0\%$ and $P_{7K}=100\%$, and the halftone dot percentage of the adjacent pictorial pixel $P_{8K}$ is $P_{8K}=0\%$, a vacant portion D is produced as shown in FIG. 7(b) along the ruling line. This phenomenon deteriorates the quality of final printed matters. However, in accordance with the method of this invention as shown in FIG. 7(c), image data of the separation colors Y, M, C and K of the pixel $P_{c1}$ are used for recording the corresponding color separation images of the border pixel $P_{c0}$.

FIG. 8(a) shows a word (bit data unit) for representing image data of a pictorial pixel.

FIG. 8(b) shows the same for representing image data of a border pixel. Image data of each pixel are expressed in 32 bits. The following explanation is based on the 32 bit data (a "word"). The first bit $d_0$ is a bit for designating whether the pixel to be processed (called "the present pixel" hereinafter) is a pictorial pixel (the bit $d_0$ is $d_0=0$) or a border pixel (the bit $d_0$ is $d_0=1$). When the present pixel is a pictorial pixel, the other 31 bits are used for representing the color separation image data of Y, M, C and K where every 8 bits are allotted to each of the color separation image data of Y, M and C, and the remaining 7 bits are allotted to the color separation image data of K.

When the pixel is a border pixel, the composition of the 32 bits is as follows. That is, 25 bits from $d_7$ to $d_{31}$ are used for representing the bit pattern of the border pixel as shown in FIG. 8(b), wherein each of the bits $d_7$ to $d_{31}$ corresponds to the portion of the same sign shown in FIG. 9.

The other 6 bits $d_1$, $d_2$, $d_3$, $d_4$, $d_5$ and $d_6$ are used as follows. The bit $d_0$ is used for designating the type of the present pixel as mentioned before (when the present pixel is a border pixel, the bit $d_0$ is $d_0 = 1$). The bit $d_1$ is used for designating whether the present pixel must have a ruling line (the bit $d_1$ is $d_1 = 1$) or not (the bit $d_1$ is $d_1 = 0$).

The bit $d_2$ is used for designating whether the appearance of a vacant portion on the present pixel must be suppressed (the bit $d_2$ is $d_2 = 1$) or not (the bit $d_2$ is $d_2 = 0$).

When the bit $d_2$ is $d_2 = 1$, the present pixel is recorded by using image data of a ruling line and one of the surrounding pixels thereof as mentioned later.

The bits $d_3$, $d_4$, $d_5$ and $d_6$ are used for designating on which color separation films of Y, M, C and K a ruling line (mainly) is to be recorded. When the ruling line must be recorded on the Y and M color separation films, the sequence of the bits $d_3$ $d_4$ $d_5$ $d_6$ becomes $d_3$ $d_4$ $d_5$ $d_6 = 1100$.

Therefore, when the present pixel is a pictorial pixel, the bit $d_0$ becomes $d_0 = 1$ and the other 31 bits are used for representing the color separation image data of Y (8 bit), M (8 bit), C (8 bit) and K (7 bit) as indicated in Table 2 (Mode I).

When the present pixel is a border pixel between a pictorial pixel and another pictorial pixel or a screen tint pixel, and there is no need to suppress the appearance of a vacant portion, the bits $d_0$, $d_1$ and $d_2$ become $d_0 = 1$, $d_1 = 0$ and $d_2 = 0$ as indicated in Table 2 (Mode II). In this case, the present (border) pixel is recorded by using image data of two of the surrounding pixels thereof (in FIG. 5, they are the pixels $P_{c1}$ and $P_{c2}$).

When the present pixel is a border pixel between a pictorial pixel and another pictorial pixel or a screen tint pixel, and there is a need to suppress the appearance of a vacant portion, the bits $d_0$, $d_1$ and $d_2$ become $d_0 = 1$, $d_1 = 0$ and $d_2 = 1$ as indicated in Table 2 (Mode V).

In any case, the value of the bit $d_2$ in each word is prerecorded by the human operator prior to printing depending upon whether the prevention of vacant or blank portions in the pixel must be suppressed.

In the above Modes II and V, if one of the surrounding pixels $P_{c1}$ and $P_{c2}$ has 0% halftone dot, image data of the other surrounding pixel are used for recording all the surface of the present (border) pixel.

When the present pixel is a border pixel and is to be recorded by using ruling line data, the bit $d_1$ becomes $d_1 = 1$. Moreover in this condition, when the ruling line is to be recorded in 100% halftone dot density (solid), the bit $d_2$ becomes $d_2 = 1$. In this case, the bits $d_3$, $d_4$, $d_5$ and $d_6$ become "1" or "0" respectively in order to designate a separation color film on which the ruling image must be recorded out of four separation color films Y, M, C and K as indicated in Table 2 (Mode VI).

When the ruling line is to be recorded in 0% halftone dot density (vacant), the bit $d_2$ becomes $d_2 = 0$. In this case, referring to FIG. 3, the area numbered "1" of each of four color separation images Y, M, C and K is recorded in 0% halftone dot density (namely, nothing is recorded), the area numbered "0" of each of the color separation images Y, M, C and K is recorded by using the image data of $P_{c1}$ (FIG. 5) as indicated in Table 2 (Mode VII).

When all the surrounding pixels of a border pixel are border pixels too, the bits $d_0$, $d_1$ and $d_2$ become $d_0 = 2$, $d_1 = 0$ and $d_2 = 1$, and one portion of the border pixel is recorded by using one separation color ink of 100% halftone dot density as indicated in Table 2 (Mode III).

FIGS. 10(a) to (h) show that image data of which pixels are used for recording the border pixel. Actually, the border line L' is not always a straight line but can be assumed so in the level of one pictorial pixel. Therefore, whichever course the border line L' may pass, it can be one of the states of FIGS. 10(a) to (h).

In the method of this invention, the pixels of which data are used for recording the border pixel are determined according to the state of four corners of the border pixel, that is, each of the bits $d_{31}$, $d_{27}$, $d_{11}$ and $d_7$ shown in FIG. 9 is "1" or "0" as mentioned later.

FIG. 11 shows a surrounding pixel selector 27 for selecting two pixels of which data are used for recording the border pixel according to the state of four corners thereof. The surrounding pixel selector 27 is connected to a latch 26 in a circuit shown in FIG. 14 (mentioned later). In FIG. 11, one of output signals $C_0$ to $C_{15}$ from a priority encoder $71_{-1}$ becomes "1", while one of output signals $C'_0$ to $C'_{15}$ from a priority encoder $71_{-2}$ becomes "1" according to the state of four corners of the border pixel as shown in Table 1. Consequently, data M for designating one surrounding pixel $P_{c1}$ and data N for designating another surrounding pixel $P_{c2}$ are output from respective corresponding terminals of $D_1 \ldots D_4$, $D_6 \ldots D_9$. Said data M and N are input to pixel data selectors 37 and 38 of the circuit shown in FIG. 14.

Figure 12:
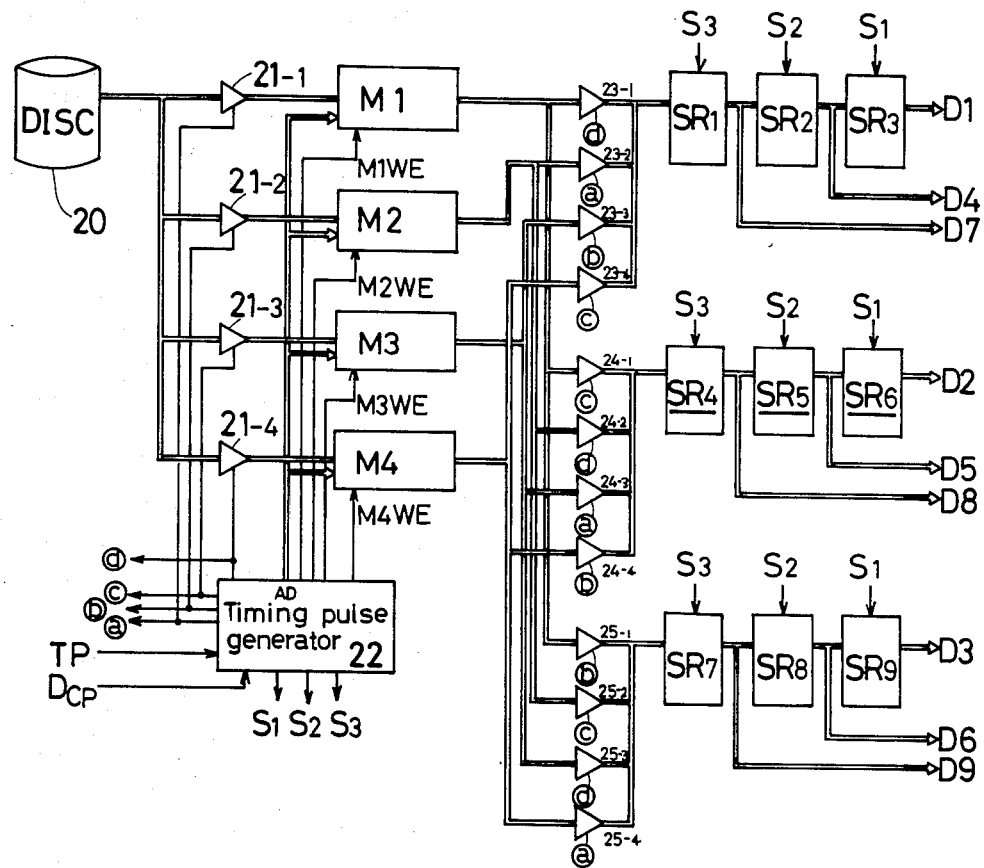
FIG. 12 shows a circuit for regulating the order of data of this invention.
Figure 13:
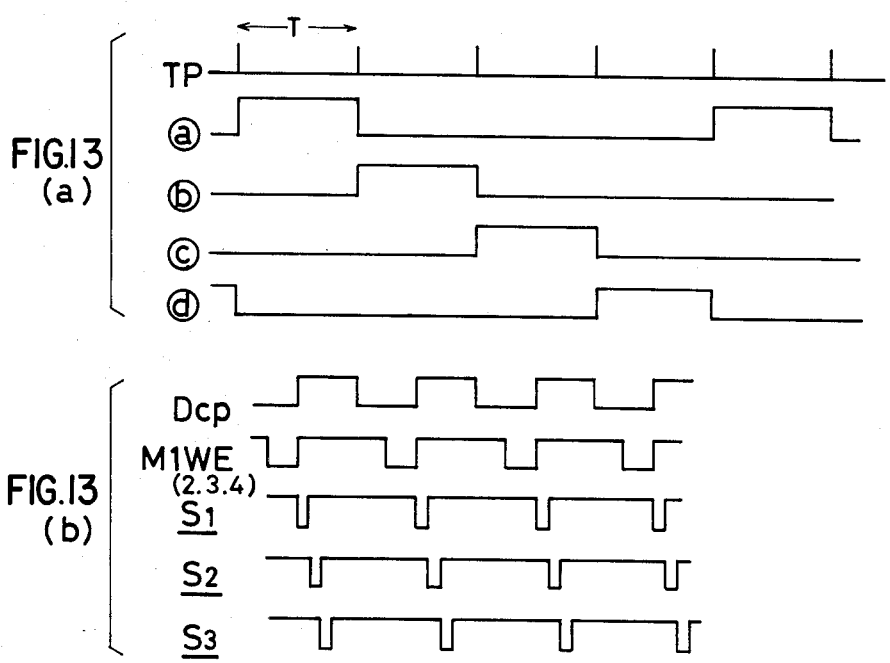
FIGS. 13(a) and 13(b) show a signal timing chart of the circuit shown in FIG. 12.

FIG. 12 shows a data order regulator which regulates image data of each pixel to output image data of the present pixel (the pixel $D_5$ in FIG. 6) from an identical terminal when image data which experienced a layout process are read from a memory of large capacity such as a disc memory. FIG. 13 shows the timing chart of the data order regulator of FIG. 12.

At first, a timing pulse generator 22 generates a pulse TP which is output once a revolution of an original picture drum from a rotary encoder connected coaxially to the drum.

The timing pulse generator 22 generates buffer control signals (a), (b), (c) and (d) as shown in FIG. 13(a) by using the one pulse TP.

To the timing pulse generator 22, a data clock pulse $D_{cp}$ for controlling reading time of the image data from a memory 20 is applied. By using the clock pulse $D_{cp}$, the timing pulse generator 22 generates writing control signals M1WE, M2WE, M3WE and M4WE for respective line memories $M_1$, $M_2$, $M_3$ and $M_4$, an address signal AD of which value (number) is increased every time the clock pulse $D_{cp}$ is input thereto, and shift signals $S_1$, $S_2$ and $S_3$ are developed for giving a shift order to image data to shift registers $SR_1$ to $SR_9$.

When the buffer control signal (a) output from the timing pulse generator 22 becomes "1", the signal (a) opens a tri-state buffer $21_{-1}$ to pass image data from the memory 20 through to the corresponding addresses of a line memory $M_1$ according to the address signal AD. At the same time from the line memories $M_2$, $M_3$ and $M_4$ which already hold image data of the previous three scanning lines, the image data are read according to the address signal AD and are input via tri-state buffers $23_{-2}$, $24_{-3}$ and $25_{-4}$ to shift register groups $SR_1$ to $SR_3$, $SR_4$ to $SR_6$ and $SR_7$ to $SR_9$, respectively.

Assuming that image data of the pixels $D_1$ to $D_9$ (shown in FIG. 6) are input to the shift registers $SR_1$ to SR$_9$, at first the image data of the pixels D$_1$, D$_2$ and D$_3$ held in the respective shift registers SR$_3$, SR$_6$ and SR$_9$ are read with the shift signal S$_1$. Secondly, the image data of the pixels D$_4$, D$_5$ and D$_6$ held in the respective shift registers SR$_2$, SR$_5$ and SR$_8$ are read in synchronism with the shift signal S$_2$. Simultaneously, the image data of the pixels D$_4$, D$_5$ and D$_6$ are shifted to the shift registers SR$_3$, SR$_6$ and SR$_9$ respectively. Then the image data of the pixels D$_7$, D$_8$ and D$_9$ held in the respective shift registers SR$_1$, SR$_4$ and SR$_7$ are read in synchronism with the shift signal S$_3$. Simultaneously, the image data of the pixels D$_7$, D$_8$ and D$_9$ are shifted to the shift registers SR$_2$, SR$_5$ and SR$_8$ respectively. Consequently, the image data of the pixels D$_1$ to D$_9$ are output from the data order regulator in synchronism with the clock pulse D$_{cp}$.

When the buffer control signal (b) output from the timing pulse generator 22 becomes "1", image data read from the memory 20 are input via a tri-state buffer 21$_{-2}$ to a line memory M$_2$. At the same time, image data of the previous three scanning lines held in the line memories M$_3$, M$_4$ and M$_1$ are read according to the control signals M3WE, M4WE and M1WE respectively. These image data are input via tri-state buffers 23$_{-3}$, 24$_{-4}$ and 25$_{-1}$ to the shift register groups SR$_1$ to SR$_3$, SR$_4$ to SR$_6$ and SR$_7$ to SR$_9$, respectively. Subsequently, the same process is repeated in the stages controlled by the control signals (c) and (d). In every case, the data order regulator outputs the image data of the present pixel D$_5$ and the surrounding pixels D$_1$ . . . D$_4$, D$_6$ . . . D$_9$ from the corresponding terminals. That is, the image data of the pixels D$_1$, D$_2$ and D$_3$ are output from the shift registers SR$_3$, SR$_6$ and SR$_9$ respectively in synchronism with the shift signal S$_1$. The image data of the pixels D$_4$, D$_5$ and D$_6$ are output from the shift registers SR$_2$, SR$_5$ and SR$_8$ in synchronism with the shift signal S$_2$. The image data of the pixels D$_7$, D$_8$ and D$_9$ are output from the shift registers SR$_1$, SR$_4$ and SR$_7$ respectively in synchronism with the shift signal S$_3$.

Figure 14:
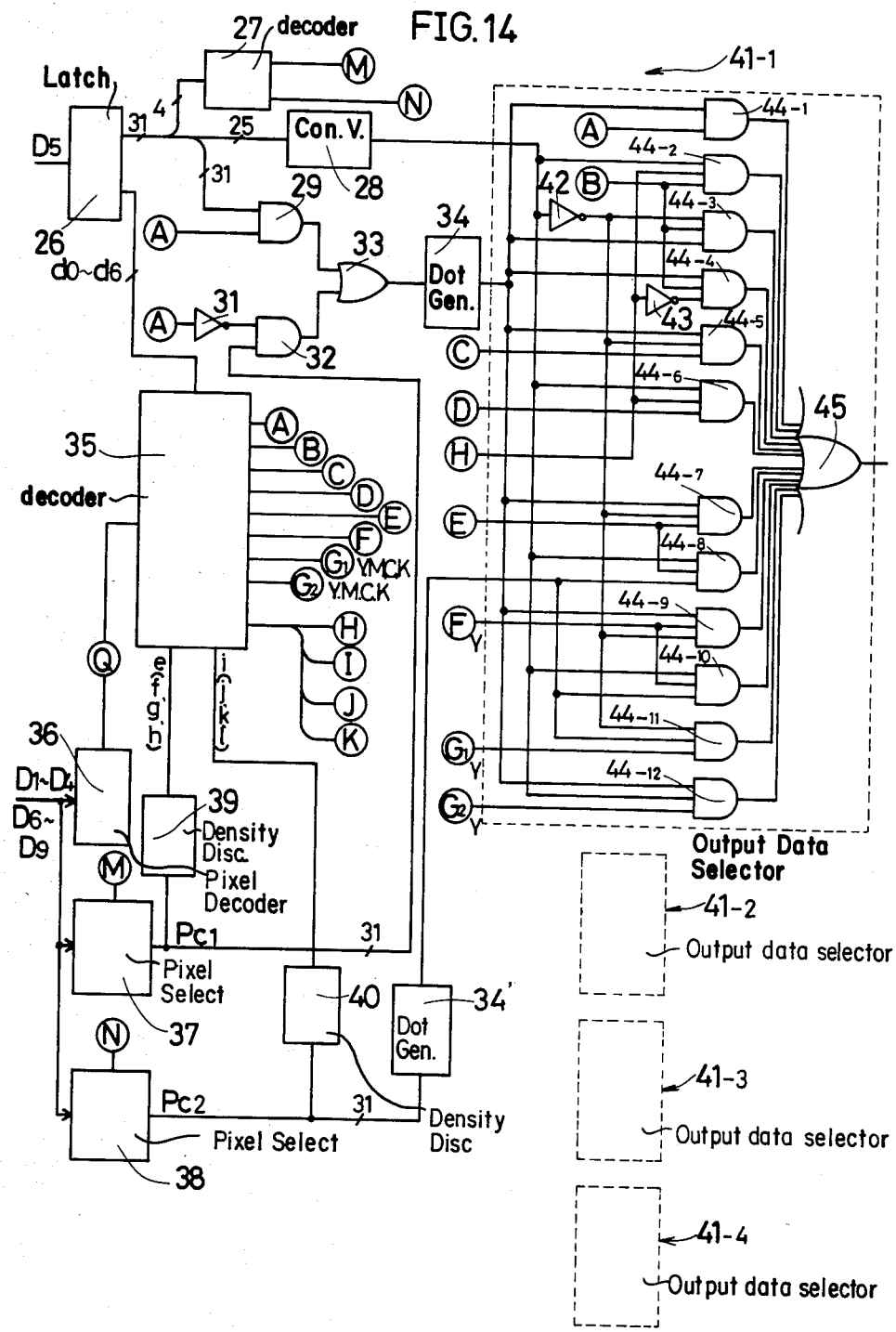
FIG. 14 shows a border pixel processer of this invention.
Figure 15:
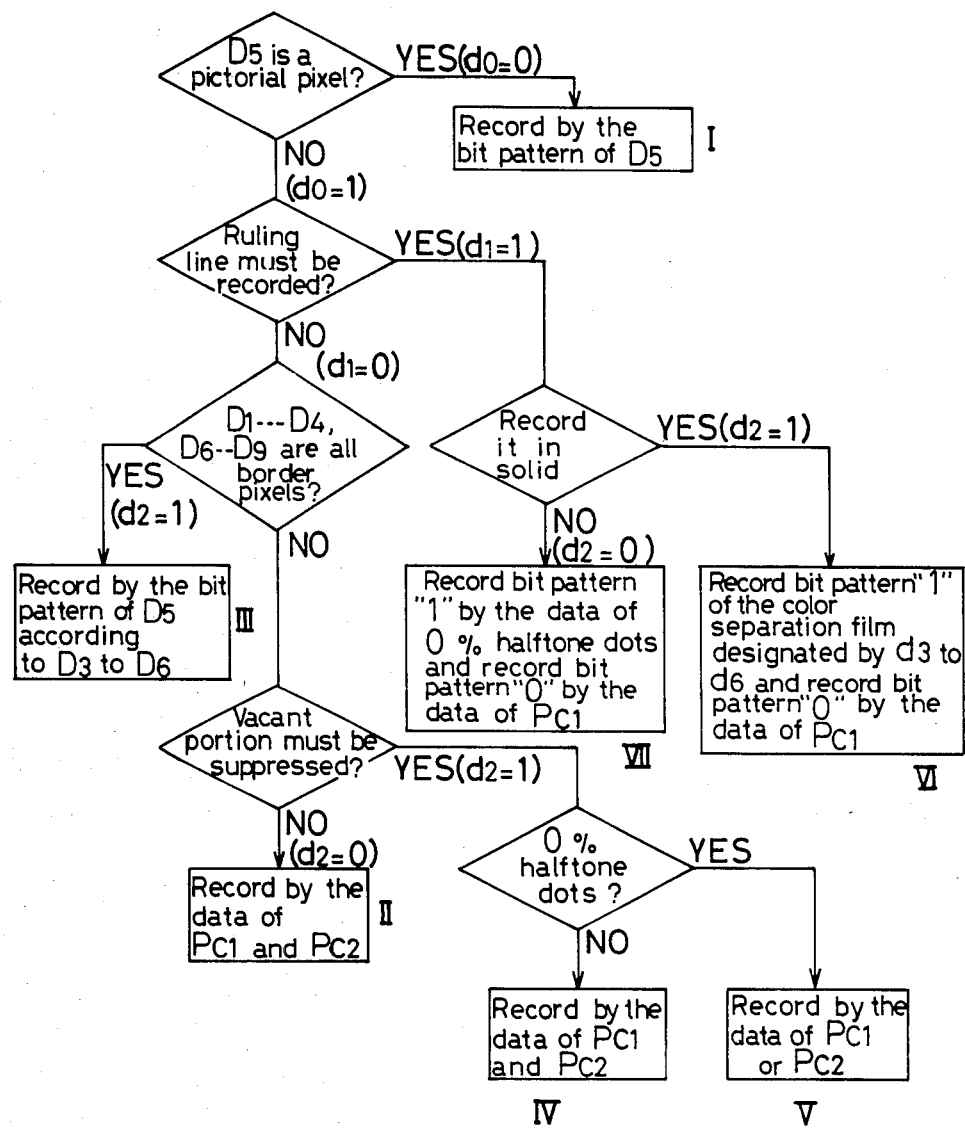
FIG. 15 shows a flow chart indicating the process of the method of this invention.

FIG. 14 shows a border pixel processor of this invention and FIG. 15 shows the flow chart indicating the process of the method of this invention. In FIG. 14, the data bit number of each line is as shown therein, however FIG. 14 prints one element on each line for simplification. The image data of the present pixel D$_5$ output from the data order regulator are at first latched in a latch 26. Among the 32 bit data of the present pixel D$_5$, data corresponding to the 7 bits d$_0$ to d$_6$ are input to a decoder 35.

Figure 16:
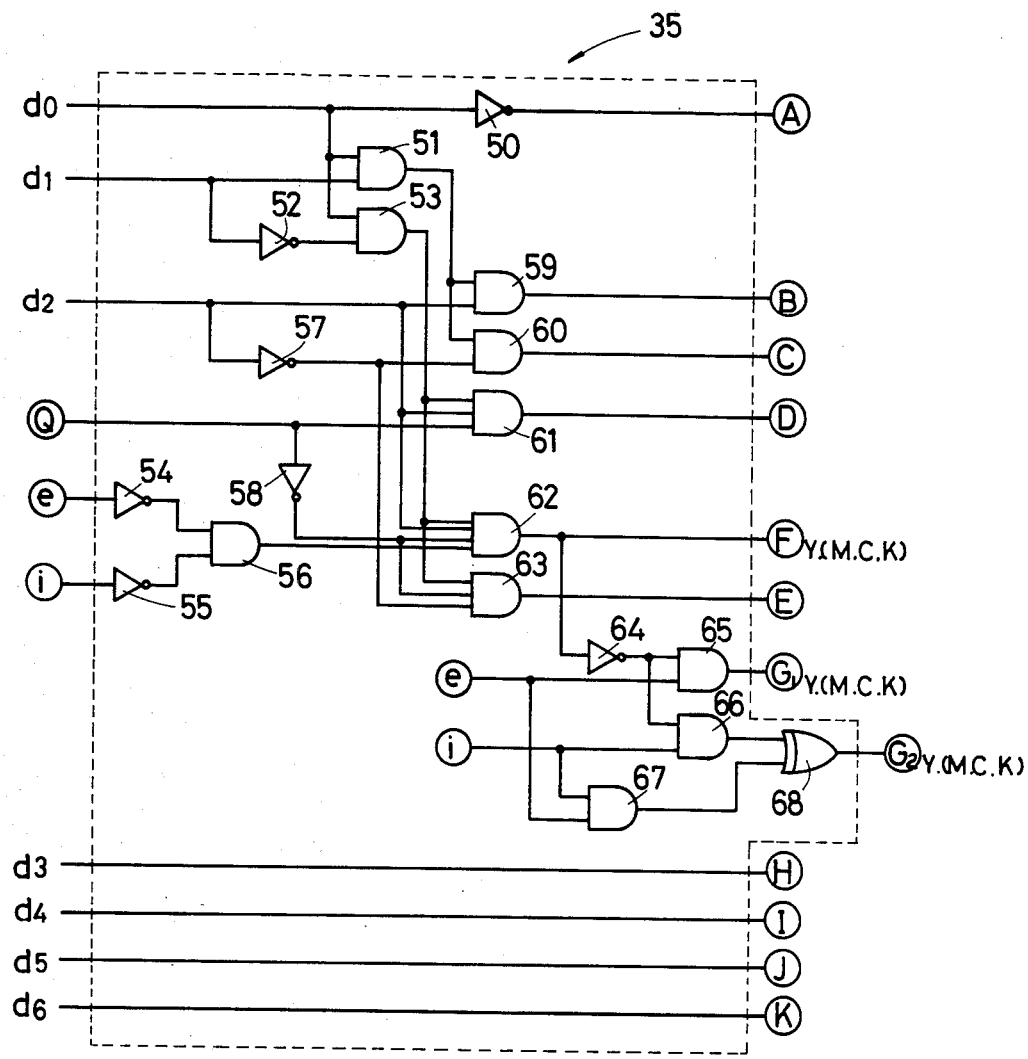
FIG. 16 shows a decoder of this invention.

The decoder 35 has a structure as shown in FIG. 16. The decoder 35 judges to which type of the following seven modes I to VII the present pixel D$_5$ corresponds according to the bits d$_0$ to d$_6$ and signals $\textcircled{Q}$, $\textcircled{e}$ and $\textcircled{i}$ (mentioned later). The following explanation of FIG. 14 is based on Table 2 and the flow chart shown in FIG. 15.

Mode I: When the present pixel is a pictorial pixel, the bit d$_0$ indicates d$_0$=0 as in FIG. 15. The value of the bit d$_0$ is inverted in an inverter 50 to become "1" and is output as a signal $\textcircled{A}$ from the decoder 35. The output signal opens an AND-gate 29 while the signal $\textcircled{A}$ is inverted in an inverter 31 to close an AND-gate 32. Therefore, the 31 bit pictorial data are input via an OR-gate 33 to a halftone dot generator 34. The halftone dot data from the halftone dot generator 34 are output via an AND-gate 44$_{-1}$ and an OR-gate 45 of each of output data selectors 41$_{-1}$ to 41$_{-4}$. As a result, the present pixel D$_5$ is recorded by using the halftone dot data of the pictorial pixel.

As the data selectors 41$_{-1}$ to 41$_{-4}$ are similar, the following explanation is directed toward only selector 41$_{-1}$.

Meanwhile, image data of the surrounding pixels D$_1$ . . . D$_4$, D$_6$ . . . D$_9$ are input to a surrounding pixel decoder 36 and are used for supplying a selection signal to the decoder 35 when the present pixel D$_5$ is a border pixel. The data are also input to pixel data selectors 37 and 38.

The following Mode II to VII indicate cases in which the present pixel D$_5$ is not a pictorial pixel but rather is a border pixel.

Figure 18:
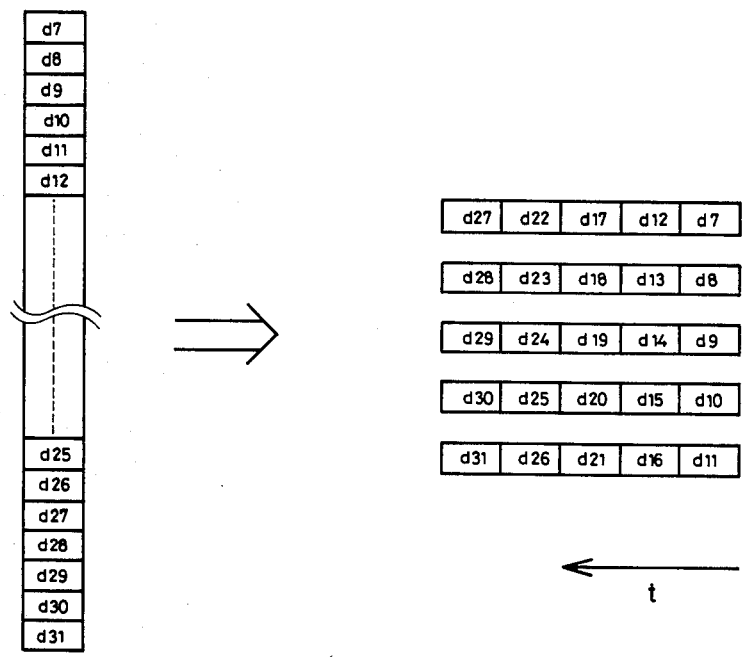
FIG. 18 shows the function of a parallel-series converter of this invention.

Mode II: When the present pixel is a border pixel between a pictorial component and another pictorial component or a screen tint component, at least one of the surrounding pixels D$_1$ . . . D$_4$, D$_6$ . . . D$_9$ is not a border pixel, and the appearance of a vacant or blank portion need not be suppressed; the bits d$_0$, d$_1$ and d$_2$ indicate d$_0$=1, d$_1$=0 and d$_2$=0 respectively. In this case, as a signal $\textcircled{Q}$ output from the surrounding pixel decoder 36 is $\textcircled{Q}$=0, an AND-gate 63 is opened to render an output signal $\textcircled{E}$ becomes =1. In the meantime, as the signal $\textcircled{A}$ becomes $\textcircled{A}$=0, the AND-gate 29 is closed and the AND-gate 32 is opened. Then the image data of two of the surrounding pixels D$_1$ . . . D$_4$, D$_6$ . . . D$_9$ which are selected as the pixels P$_{c1}$ and P$_{c2}$ by the pixel data selectors 37 and 38 are input via the halftone dot generator 34 and 34' to AND-gates 44$_{-7}$ and 44$_{-8}$ respectively. On the other hand, the bit pattern data of the present (border) pixel D$_5$ is used for controlling the AND-gates 44$_{-7}$ and 44$_{-8}$, when the bit pattern data already undergoes parallel/series conversion in a parallel-series converter 28 as shown in FIG. 18. As a result, two portions of the pixel D$_5$ are recorded by using the halftone dot data of the pixels P$_{c1}$ and P$_{c2}$.

Each of the pixel data selectors 37 and 38 is composed of tri-state buffers 70$_{-1}$ to 70$_{-8}$ as shown in FIG. 17. They select the pixels P$_{c1}$ and P$_{c2}$ from out of the surrounding pixels to use the image data thereof for recording the border pixel on command of the signal $\textcircled{M}$ and $\textcircled{N}$ output from the decoder 27.

Mode III: When the present pixel is a border pixel between a pictorial component and another pictorial component or a screen tint component, all the surrounding pixels D$_1$ . . . D$_4$, D$_6$ . . . D$_9$ are border pixels, and the appearance of a vacant portion must be suppressed; the bits d$_0$, d$_1$ and d$_2$ indicate d$_0$=1, d$_1$=0 and d$_2$=1 respectively, and one or more of the bits d$_3$, d$_4$, d$_5$ and d$_6$ indicate(s) "1". Thus, one or more of signal(s) $\textcircled{H}$, $\textcircled{I}$, $\textcircled{J}$ and $\textcircled{K}$ for designating desired separation colors output from the decoder 35 become(s) "1". At the same time the signal $\textcircled{Q}$ from the surrounding pixel decoder 36 becomes "1" to open an AND-gate 61, and then the decoder 35 outputs a signal $\textcircled{D}$ of logic "1".

By being controlled by the separation color designation signals $\textcircled{H}$, $\textcircled{I}$, $\textcircled{J}$ and $\textcircled{K}$ and the bit pattern data of the present pixel D$_5$ from the P/S converter 28, (an) AND-gate(s) 44$_{-1}$ to 44$_{-4}$ is (are) opened. As a result, one portion of the present pixel D$_5$ of the designated separation color films is recorded in 100% halftone dot density.

When no ruling line must be recorded on the present pixel D$_5$ and the appearance of a vacant portion must be suppressed, the bits d$_0$, d$_1$ and d$_2$ indicate d$_0$=1, d$_1$=0 and $d_2 = 1$ respectively. In this case, signals Ⓔ and Ⓘ are output from zero percent density discriminators 39 and 40, which discriminate whether the image data of the pixels $P_{c1}$ and $P_{c2}$ selected in the surrounding pixel selectors 37 and 38 are 0% halftone dot data or not. The zero percent density discriminators 39 and 40 are provided in each circuit of the separation colors Y, M, C and K. If the image data of the pixels $P_{c1}$ and $P_{c2}$ are 0% halftone dot data, the signals Ⓔ and Ⓘ become Ⓔ = 1 and Ⓘ = 1. If the image data of the pixels $P_{c1}$ and $P_{c2}$ are not 0% halftone dot data, the signals Ⓔ and Ⓘ become Ⓔ = 0 and Ⓘ = 0.

Mode IV: When the present pixel $D_5$ is a border pixel between a pictorial component and another pictorial component or a screen tint component, the appearance of a vacant portion must be suppressed and both the signals Ⓔ and Ⓘ are Ⓔ = 0; the output signal of an AND-gate 56 becomes "1" to open an AND-gate 62. Consequently, the decoder 35 outputs a signal Ⓕ of logic "1". Therefore by being controlled by the signal Ⓕ and the bit pattern data of the present pixel $D_5$, AND-gates $44_{-9}$ and $44_{-10}$ of respective output data selectors $41_{-1}$ to $41_{-4}$ are opened. As a result, two portions of the present pixel $D_5$ are recorded by using the halftone dot data of the pixels $P_{c1}$ and $P_{c2}$ output from respective halftone dot generators 34 and 34'.

Mode V: When the present pixel $D_5$ is a border pixel between a pictorial component and another pictorial component or a screen tint component, the appearance of a vacant portion must be suppressed, and one of the signals Ⓔ and Ⓘ indicates "0" and the other indicates "1"; the output signal from the AND-gate 62 becomes "0" to open an AND-gate 66 (or an AND-gate 65). Consequently, a signal Ⓖ₂ (or a signal Ⓖ₁) of logic "1" is output from the decoder 35 as a selection signal. Therefore one of AND-gates $44_{-11}$ and $44_{-12}$ of designated ones of output data selectors $41_{-1}$ to $41_{-4}$ are opened according to the signals Ⓔ and Ⓘ from respective zero percent density discriminators 39 and 40. As a result, one of two portions of the present pixel $D_5$ is recorded by using as the halftone dot data either of the pixels $P_{c1}$ and $P_{c2}$ output from respective halftone dot generators 34 and 34'.

In Mode V, both of the signals Ⓔ and Ⓘ indicate Ⓔ = Ⓘ = 1, the output signal Ⓖ₁ from the AND-gate 65 and the output signal from the AND-gate 66 become logic "1". At the same time as the output signal from an AND-gate 67 becomes "1", the output signal Ⓖ₂ from an Exclusive-OR-gate 68 becomes "0". In short, only the signal Ⓖ₁ becomes "1". Consequently, output from an AND-gate $44_{-11}$ is the image data of the pixel $P_{c2}$ of 0% halftone dot density. This is equivalent to the case wherein no image data are output from the AND-gate $44_{-11}$ of the output data selector $41_{-1}$, which means that nothing is recorded on the present pixel $D_5$.

Mode VI: When the present pixel $D_5$ is a border pixel between a ruling line component and a pictorial component or a screen tint component, and the appearance of a vacant portion must be suppressed; the bits $d_0$, $d_1$ and $d_2$ indicate $d_0 = d_1 = d_2 = 1$. These bits open an AND-gate 59 of the decoder 35 to output a signal Ⓑ of logic "1". At the same time, the separation color designation signals Ⓗ, Ⓘ, Ⓙ and Ⓚ corresponding to respective bits $d_3$, $d_4$, $d_5$ and $d_6$ (at least one of these bits indicate(s) "1") are input to the output data selectors $41_{-1}$, $41_{-2}$, $41_{-3}$ and $41_{-4}$ respectively.

Assuming that the signal H is H = 1, according to the portion "1" of the bit pattern of the present pixel $D_5$ output from the P/S converter 28, a ruling line data (logic "1" in this case) is output from from an AND-gate $44_{-2}$ of the output data selector $41_{-1}$. As a result, the portion "1" of the present pixel $D_5$ is recorded by using the ruling line data. Meanwhile the portion "0" of the bit pattern of the present pixel $D_5$ is recorded by using the halftone dot data of the pixel $P_{c1}$ output from the halftone dot generator 34 via the AND-gate $44_{-1}$.

In Mode VI, when the separation color designation signal Ⓗ (Ⓘ, Ⓙ or Ⓚ) becomes "0", the signal Ⓗ (Ⓘ, Ⓙ or Ⓚ) of logic "0" is inverted in an inverter 43 to open an AND-gate $44_{-4}$ of the output data selector $41_{-1}$ ($41_{-2}$, $41_{-3}$ or $41_{-4}$). As a result, the entire pixel $D_5$ is recorded by using the halftone dot data of the pixel $P_{c1}$ output from the halftone dot generator 34 via the AND-gate $44_{-4}$.

Mode VII: When the present pixel $D_5$ is a border pixel between a ruling line component and a pictorial component or a screen tint component, and the ruling line must be recovered in white (vacant); the bits $d_0$, $d_1$ and $d_2$ indicate $d_0 = d_1 = 1$ and $d_2 = 0$. Consequently, the decoder 35 outputs a signal Ⓒ of logic "1" and the signals Ⓗ, Ⓘ, Ⓙ and Ⓚ of logic "1", which signals open an AND-gate $44_{-5}$ of respective output data selectors $41_{-1}$ to $41_{-4}$. As a result, nothing is recorded on the portion "1" of the bit pattern of the present pixel $D_5$ output from the P/S converter 28 with regard to all the color separation factors. The portion "0" of the bit pattern of the present pixel $D_5$ is recorded by using the halftone dot data of the pixel $P_{c1}$ output from the halftone dot generator 34 via the AND-gate $44_{-5}$.

As is mentioned above, in the method of this invention, a border pixel between, e.g., a pictorial component and another pictorial component or a ruling line component is recorded by using image data of two of the surrounding pixels thereof according to the bit pattern data of the border pixel. In addition, when it is suspected that a vacant or blank portion might be produced on the border pixel owing to possible poor registration, the border pixel is recorded by using image data of one surrounding pixel. Therefore, the method of this invention is capable of suppressing the appearance of every type of vacant portions which might take place on a photosensitive film in reproducing images by using an image reproducing system such as a layout scanner.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

TABLE 1

| The state of four corners | | | | Output from the encoder | The pixel to be designated | Output from the encoder | The pixel to be designated |
|---|---|---|---|---|---|---|---|
| $d_{31}$ | $d_{27}$ | $d_{11}$ | $d_7$ | $71_{-1}$ | as $P_{c1}$ | $71_{-2}$ | as $P_{c2}$ |
| 0 | 0 | 0 | 0 | $C_0$ | $D_2$ | $C'_0$ | $D_8$ |
| 0 | 0 | 0 | 1 | $C_1$ | $D_1$ | $C'_1$ | $D_9$ |
| 0 | 0 | 1 | 0 | $C_2$ | $D_3$ | $C'_2$ | $D_7$ |

TABLE 1-continued

| The state of four corners | | | | Output from the encoder | The pixel to be designated | Output from the encoder | The pixel to be designated |
|---|---|---|---|---|---|---|---|
| $d_{31}$ | $d_{27}$ | $d_{11}$ | $d_7$ | $71_{-1}$ as $P_{c1}$ | | $71_{-2}$ | as $P_{c2}$ |
| 0 | 0 | 1 | 1 | $C_3$ | $D_2$ | $C'_3$ | $D_8$ |
| 0 | 1 | 0 | 0 | $C_4$ | $D_7$ | $C'_4$ | $D_3$ |
| 0 | 1 | 0 | 1 | $C_5$ | $D_4$ | $C'_5$ | $D_6$ |
| 0 | 1 | 1 | 0 | $C_6$ | $D_1$ | $C'_6$ | $D_9$ |
| 0 | 1 | 1 | 1 | $C_7$ | $D_1$ | $C'_7$ | $D_9$ |
| 1 | 0 | 0 | 0 | $C_8$ | $D_9$ | $C'_8$ | $D_1$ |
| 1 | 0 | 0 | 1 | $C_9$ | $D_3$ | $C'_9$ | $D_7$ |
| 1 | 0 | 1 | 0 | $C_{10}$ | $D_6$ | $C'_{10}$ | $D_4$ |
| 1 | 0 | 1 | 1 | $C_{11}$ | $D_3$ | $C'_{11}$ | $D_7$ |
| 1 | 1 | 0 | 0 | $C_{12}$ | $D_8$ | $C'_{12}$ | $D_2$ |
| 1 | 1 | 0 | 1 | $C_{13}$ | $D_7$ | $C'_{13}$ | $D_3$ |
| 1 | 1 | 1 | 0 | $C_{14}$ | $D_9$ | $C'_{14}$ | $D_1$ |
| 1 | 1 | 1 | 1 | $C_{15}$ | $D_2$ | $C'_{15}$ | $D_8$ |

TABLE 2

| | | Bits | | | | | | | Signal | | | The state of the present pixel |
|---|---|---|---|---|---|---|---|---|---|---|---|---|
| | | $d_0$ | $d_1$ | $d_2$ | $d_3$ | $d_4$ | $d_5$ | $d_6$ | Q | e | i | |
| Modes | I | 0 | — | — | — | — | — | — | — | — | — | $D_5$ |
| | II | 1 | 0 | 0 | 0 | 0 | 0 | 0 | 0 | — | — | $P_{c1}/P_{c2}$ |
| | III | 1 | 0 | 1 | at least one bit is (are) "1" | | | | 1 | — | — | solid/$\bigcirc$ |
| | IV | 1 | 0 | 1 | 0 | 0 | 0 | 0 | 0 | 0 | 0 | $P_{c1}/P_{c2}$ |
| | V | 1 | 0 | 1 | 0 | 0 | 0 | 0 | 0 | one bit is (are) "1" | | $P_{c1}/$ or $/P_{c2}$ ($\bigcirc/\bigcirc$) |
| | VI | 1 | 1 | 1 | at least one bit is (are) "1" | | | | 0 | — | — | $P_{c1}$ or $P_{c1}/$ruling line (solid) |
| | VII | 1 | 1 | 0 | 1 | 1 | 1 | 1 | 0 | — | — | $P_{c1}/$ruling line (vacant) |

Notes:
In the state of the present pixel;
— ... a border line
$\bigcirc$ ... nothing is recorded

I claim:

1. In an image reproducing system using color separation films for reproducing multiple color images, a method for processing a border pixel located between two pictorial components of an image or between a pictorial component and a line component of an image, comprising the steps of:
   (a) scanning an original to generate pixels, each pixel comprising a number of smaller pixels to provide improved resolution;
   (b) detecting a border pixel among the pixels generated;
   (c) obtaining image data associated with the smaller pixels making up said border pixel;
   (d) selecting on the basis of said image data at least one pixel from pixels surrounding said border pixel; and
   (e) obtaining and using image data associated with said selected surrounding pixels for recording said border pixel on said color separation films.

2. A method as claimed in claim 1 in which the image data of the selected surrounding pixels is used for recording the entire border pixel.

3. A method as claimed in claim 1 in which the image data of the selected surrounding pixels are used for recording respective portions of the border pixel which share at least one border line within said border pixel.

4. A method as claimed in claim 3 in which two surrounding pixels are selected and the image data of the two selected surrounding pixels are used for recording two portions of said border pixel which share a border line within the border pixel.

5. A method as claimed in claim 3, further comprising independently supplying external data for controlling the recording of the border pixel, providing a data containing information concerning the border pixel, and using bit pattern data included in the word to select between the image data of the selected surrounding pixels and independently supplied image data.

6. A method as claimed in claim 1 in which, when all of the surrounding pixels are border pixels, one of two portions of said border pixel which share a border line within the border pixel is recorded on at least one of said color separation films as a solid region.

7. A method as claimed in claim 1, wherein a data word is provided containing information concerning the border pixel, the method further including, when the word designates that a line component must be recorded in a specific one of two portions of the border pixel on a specific color separation film, recording the specific one of the two portions of the border pixel using line component data and recording the other portion using the image data of one selected surrounding pixel.

8. A method as claimed in claim 1, wherein a data word is provided containing information concerning the border pixel, the method further including, when the word designates that a line component must be recorded in the border pixel on at least one color separation film, the step of recording the entire border pixel on each of the other color separation films by using the image data of respective selected surrounding pixels.

9. A method as claimed in claim 1, wherein the step of selecting includes selecting two surrounding pixels and using the image data thereof for recording two corresponding portions of the border pixel which share a border line within said border pixel.

10. In an electronic image reproduction system using color separation films to reproduce multiple color images, apparatus for processing a border pixel between two pictorial components of an image or between a pictorial component and a line component of an image, the apparatus comprising:
 (a) means for scanning an original to generate pixels, each pixel comprising a number of small pixels to provide improved resolution, and for detecting a border pixel;
 (b) selection means for selecting at least one pixel from pixels surrounding the border pixel;
 (c) means for obtaining image information associated with the selected pixels; and
 (d) means for recording said border pixel on said color separation films based on using at least in part said image information.

11. A system as claimed in claim 10, wherein a multibit data word is provided representing image information associated with the border pixel, the apparatus further including first decoding means for decoding bits ①, ②, ③ and ④ of the word representing the border pixel and second decoding means for decoding a bit pattern of the border pixel, wherein:
 bit ① indicates whether a present pixel is a border pixel;
 bit ② indicates whether the border pixel must have a line component;
 bit ③ indicates whether an appearance of any vacant portion in the border pixel must be suppressed in recording the border pixel; and
 at least one bit ④ indicates whether at least a portion of the border pixel is to either be recorded as a solid region or be left blank on corresponding color separation films.

12. An apparatus as claimed in claim 11 in which the first decoding means comprises a circuit for outputting image data of two surrounding pixels, selected by said selection means, to two corresponding portions of the border pixel which share a border line within the border pixel, wherein: bit ① indicates that the present pixel is a border pixel, bit ② indicates that the border pixel need not have a line component, bit ③ indicates that the appearance of any vacant portion in the border pixel need not be suppressed and the at least one bit ④ indicates that no portion of the border pixel is to either be recorded as a solid region or be left blank on corresponding color separation films.

13. An apparatus as claimed in claim 11 including a source of solid data representing a line component in which the first decoding means comprises a circuit for outputting image data of one of two surrounding pixels selected by said selection means and said solid data to two corresponding two portions of the border pixel which share a border line within the border pixel corresponding to the color separation films designated by the at least one bit ④, wherein when the bit ① indicates that the present pixel is a border pixel, the bit ② indicates that the border pixel must have a line component, the bit ③ indicates that the appearance of any vacant portion in the border pixel must be suppressed and the at least one bit ④ indicates that at least a portion of the border pixel is to either be recorded as a solid region or be left blank on corresponding color separation films.

14. An apparatus as claimed in claim 11 in which the first decoding means comprises a circuit for outputting the image data of one of two surrounding pixels, selected by said selection means, to the entire border pixels corresponding to color separation films other than those being designated by the at least one bit ④ when the bit ① indicates that the present pixel is a border pixel, the bit ② indicates that the border pixel must have a line component, the bit ③ indicates that any appearance of a vacant portion in the border pixel must be suppressed and the at least one bit ④ indicates that at least a portion of the border pixel is to either be recorded as a solid region or be left blank on corresponding color separation films.

15. An apparatus as claimed in claim 11 in which the first decoding means comprises means for outputting the image data of one of two surrounding pixels selected by said selection means to two corresponding portions of the border pixel which share a border line within the border pixel when the bit ① indicates that the present pixel is a border pixel, the bit ② indicates that the border pixel need not have a line component, the bit ③ indicates that the appearance of any vacant portion in the border pixel must be suppressed and the at least one bit ④ indicates that no portion of the border pixel is to either be recorded as a solid region or be left blank on corresponding color separation films.

16. An apparatus as claimed in claim 11 in which the first decoding means comprises a circuit for outputting the image data of one of two surrounding pixels and blank region to two corresponding portions of the border pixel which share a border line within the border pixel when the bit ① indicates that the present pixel is a border pixel, the bit ② indicates that the border pixel need not have a line component, the bit ③ indicates that the appearance of any vacant portion in the border pixel must be suppressed and the at least one bit ④ indicates that no portion of the border pixel is to either be recorded as a solid region or be left blank on corresponding color separation films.

17. An apparatus as claimed in claim 11 in which the first decoding means comprises a circuit for outputting the image data of one surrounding pixel and blank line component data to two corresponding portions of the border pixel which share a border line within the border pixel when the bit ① indicates that the present pixel is a border pixel, the bit ② indicates that the border pixel must have a line component, the bit ③ indicates that the appearance of any vacant portion in the border pixel need not be suppressed and the at least one bit ④ indicates that at least a portion of the border pixel is to either be recorded as a solid region or be left blank on all of the respective color separation films.

18. An apparatus as claimed in claim 11 in which the first decoding means comprises a circuit for outputting solid region data to one of two corresponding portions of the border pixel which share a border line within the border pixel when the bit ① indicates that the present pixel is a border pixel, the bit ② indicates that the border pixel need not have a line component, the bit ③ indicates that the appearance of any vacant portion in the border pixel must be suppressed, the at least one bit ④ indicates that at least a portion of the border pixel is to either be recorded as a solid region or be left blank on corresponding color separation films, and the surrounding pixels are all border pixels.

19. The apparatus as claimed in claim 11 including means responsive to an output signal of the second decoding means for distributing the image data of two surrounding pixels to two corresponding portions of the border pixel which share a border line within the border pixel.

20. The apparatus as claimed in claim 10 in which the selection means includes means for selecting two pixels from pixels surrounding the border pixel in order to use the image data thereof for recording two corresponding portions of the border pixel.

* * * * *